US012782871B2

(12) United States Patent
Kahrobaiyan et al.

(10) Patent No.: US 12,782,871 B2
(45) Date of Patent: Nov. 3, 2026

(54) BALANCE PROVIDED WITH MEANS FOR ADJUSTING ITS TEMPERATURE SENSITIVITY

(71) Applicant: The Swatch Group Research and Development Ltd, Marin (CH)

(72) Inventors: Mohammad Hussein Kahrobaiyan, Boudevilliers (CH); Baptiste Hinaux, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 279 days.

(21) Appl. No.: 18/610,350

(22) Filed: Mar. 20, 2024

(65) Prior Publication Data

US 2024/0329598 A1 Oct. 3, 2024

(30) Foreign Application Priority Data

Mar. 28, 2023 (EP) ..................................... 23164703

(51) Int. Cl.
*G04B 17/22* (2006.01)

(52) U.S. Cl.
CPC .................................. *G04B 17/222* (2013.01)

(58) Field of Classification Search
CPC .............................. G04B 17/222; G04B 17/06
USPC .......................................................... 368/171
See application file for complete search history.

(56) References Cited

U.S. PATENT DOCUMENTS 168,583 A 10/1875 Potter
798,993 A 9/1905 Culman
2021/0173350 A1 * 6/2021 Born ...................... G04D 7/084

FOREIGN PATENT DOCUMENTS

CH 715890 A2 * 8/2020 ........... G04B 17/222
CN 107505826 B * 6/2020 ............. G04B 17/22
EP 4134754 A1 * 2/2023 ............. G04B 17/26
JP 2019158844 A * 9/2019 ........... G04B 17/222

OTHER PUBLICATIONS

European Search Report issued Sep. 6, 2023 in European Application 23164703.3 filed on Mar. 28, 2023, 3 pages (with English Translation of Categories of Cited Documents).

* cited by examiner

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A balance for a regulating member of a horological movement, the balance including, at least in part, a body that can be deformed as a function of temperature, the deformable body being arranged, at least in part, on the periphery of the balance, the balance being configured so as to be able to move about a centre of rotation, the balance including a device for adjusting the sensitivity of the deformable body to temperature change, the adjustment device being provided with a first inertial element arranged on the deformable body in order to be able to modify the moment of inertia thereof, the first inertial element being capable of moving relative to the deformable body into a plurality of positions, wherein the positions form a continuous set. A horological movement and a regulating member can include such a balance.

14 Claims, 1 Drawing Sheet

BALANCE PROVIDED WITH MEANS FOR ADJUSTING ITS TEMPERATURE SENSITIVITY

CROSS-REFERENCE TO RELATED APPLICATION

This application claims priority to European Patent Application No. 23164703.3 filed on Mar. 28, 2023, the entire disclosure of which is hereby incorporated herein by reference.

TECHNICAL FIELD OF THE INVENTION

The invention relates to a balance provided with means for adjusting its temperature sensitivity, in particular for the watchmaking industry.

TECHNOLOGICAL BACKGROUND

Most mechanical watches today are equipped with a sprung balance and a Swiss lever escapement mechanism. The sprung balance constitutes the time base of the watch. It is also referred to as a resonator or regulating member.

The escapement has two main functions:

to maintain the two-and-fro motions of the resonator;

to count these to-and-fro motions.

An inertial element, a guide and a resilient return element are required in order to constitute a mechanical resonator. Conventionally, a balance spring acts as a resilient return element for the inertial element constituted by a balance. This balance is guided in rotation by pivots, which generally rotate inside plain ruby bearings.

A frequency is chosen for the mechanical resonator, and is determined in order to obtain a predefined rate for the horological movement.

However, during operation, such a mechanical resonator can be subject to interference caused by changes in external parameters, which lead to variations in the frequency of the resonator. These parameters include, for example, the temperature, pressure, humidity and gravity. The variation in the frequency of the resonator results in an error in the measurement of time and thus in the rate of the horological movement.

In particular, with regard to temperature, balances exist including a bimetallic body, which deform under the effect of temperature, so that the moment of inertia of the balance is modified to compensate for the difference in rate of the regulating member caused by the variation in temperature. Such a balance is described in the Swiss patent CH712193.

The balance includes an annular bimetallic body with two symmetrical free ends. Depending on the temperature, the one or more free ends move apart or towards each other, so as to modify the moment of inertia of the balance. The configuration of the balance is thus adapted to the temperature.

Moreover, the sensitivity of the balance to temperature change can be adjusted. The effect of the temperature change is thus more or less significant, in particular as regards its effect on the moment of inertia of the balance.

To this end, a plurality of holes are made in the body, and a screw is arranged in one of the holes, at a longer or shorter distance from the free end. Depending on the hole chosen, sensitivity to temperature change becomes more or less significant.

However, the balance has a limited number of holes, which only allow the sensitivity to be modified in jumps and not continuously.

SUMMARY OF THE INVENTION

The aim of the present invention is to overcome some or all of the aforementioned drawbacks by proposing a balance provided with means for adjusting the temperature sensitivity thereof.

To this end, the invention relates to a balance for a regulating member of a horological movement, the balance comprising, at least in part, a body that can be deformed as a function of temperature, the deformable body being arranged, at least in part, on the periphery of the balance, the balance being configured so as to be able to move about a centre of rotation, the balance comprising means for adjusting the sensitivity of the deformable body to temperature change, the adjustment means being provided with a first inertial element cooperating with the deformable body in order to be able to modify the moment of inertia thereof, the first inertial element being capable of moving on the deformable body into a plurality of positions.

The invention is noteworthy in that the positions form a continuous set.

Thanks to the invention, the adjustment means enable the sensitivity of the balance to temperature change to be adjusted with great precision, compared with adjustment means operating by discrete adjustment. This is because the number of positions is less limited and there is no inaccessible gap between two successive positions.

According to a particular embodiment of the invention, the first inertial element is arranged at a substantially constant distance from the centre of rotation, regardless of the position thereof relative to the deformable body, for a given configuration of the deformable body relative to the centre of rotation.

According to a particular embodiment of the invention, the first inertial element can move in a direction substantially tangential to the balance.

According to a particular embodiment of the invention, the deformable body comprises a first peripheral free end, the first inertial element being arranged at the first free end.

According to a particular embodiment of the invention, the adjustment means comprise a second inertial element capable of moving relative to the deformable body into a plurality of positions forming a continuous set.

According to a particular embodiment of the invention, the deformable body comprises a second free end, the second inertial element being arranged at the second free end, so as to be able to be displaced in a direction substantially tangential to the deformable body.

According to a particular embodiment of the invention, the first and second inertial elements are screws, each screw being screwed to a greater or lesser extent and tangentially to the body in a free end in order to change their positions.

According to a particular embodiment of the invention, the first and second inertial elements are arranged symmetrically relative to the centre of rotation.

According to a particular embodiment of the invention, the deformable body has an at least partially annular peripheral shape.

According to a particular embodiment of the invention, the deformable body includes a first annular part provided with the first free end, and a second annular part provided with the second free end.

According to a particular embodiment of the invention, the first and second annular parts each include a bimetallic attachment so that they can deform as a function of temperature.

According to a particular embodiment of the invention, the two annular parts are connected by a radial section.

According to a particular embodiment of the invention, the two annular parts are arranged symmetrically relative to the centre of rotation.

The invention further relates to a regulating member including such a balance.

The invention further relates to a horological movement including such a regulating member.

BRIEF DESCRIPTION OF THE FIGURES

The purposes, advantages and features of the present invention will become apparent after reading several embodiments, which are provided for purposes of illustration only and not intended to limit the scope of the invention, given with reference to the accompanying drawings, wherein.

DETAILED DESCRIPTION OF THE INVENTION

Figure 1:
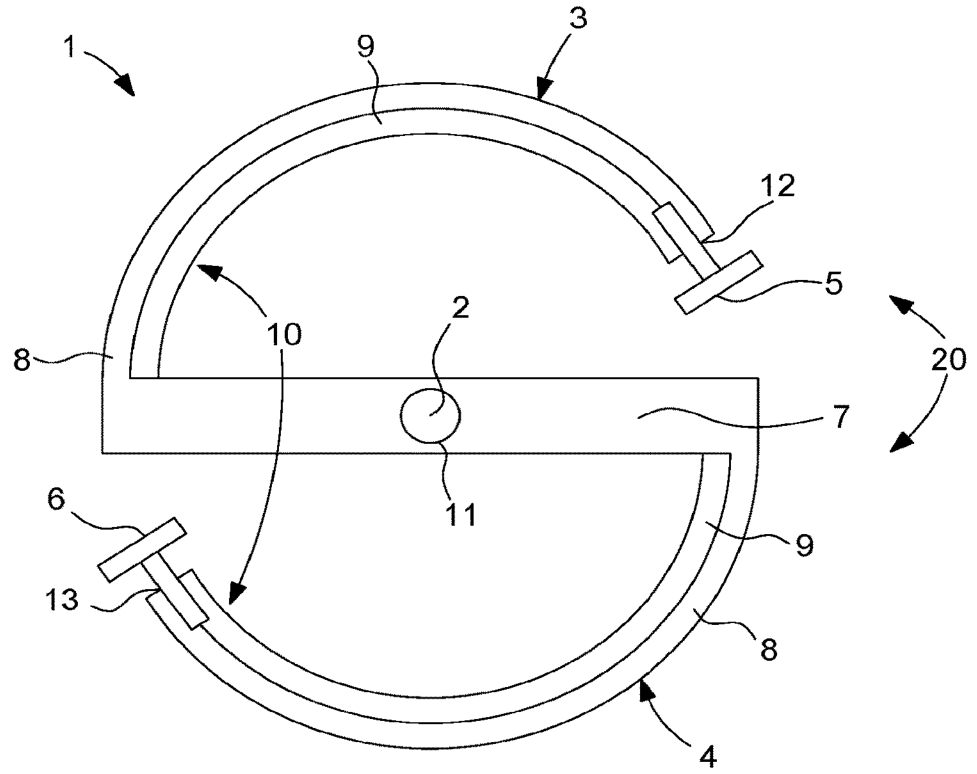
FIG. 1 is a diagrammatic top view of a balance according to one embodiment of the invention, in a first configuration.
Figure 2:
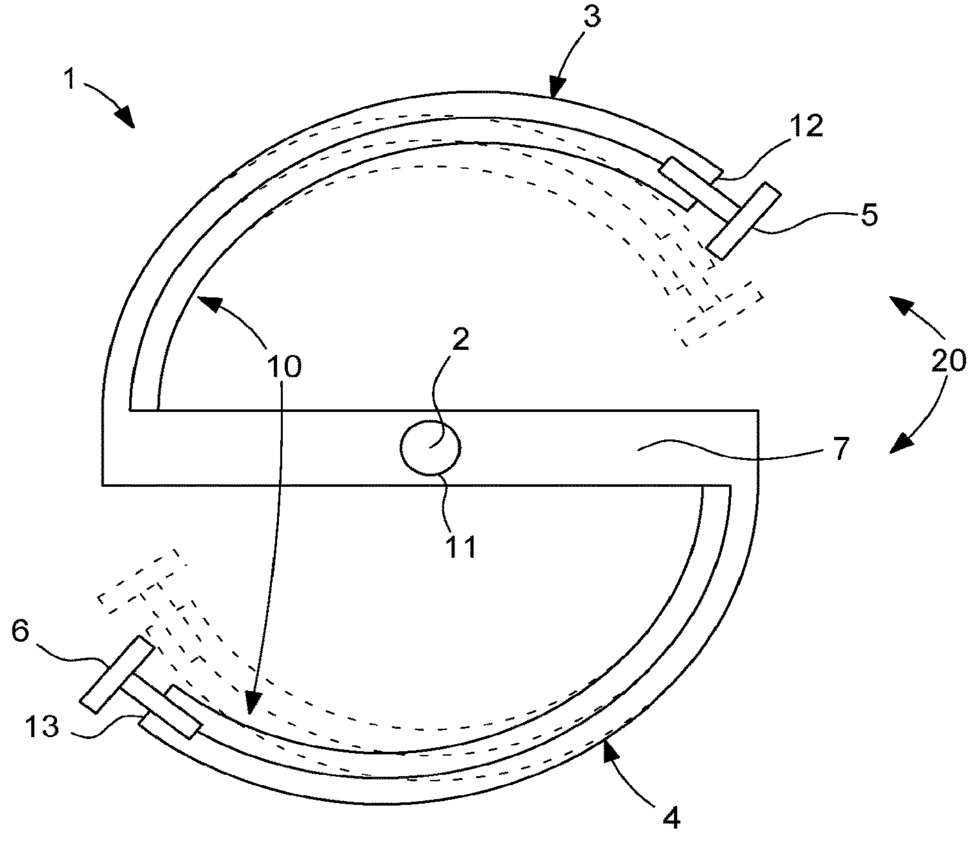
FIG. 2 is a diagrammatic top view of the balance in FIG. 1 in a second configuration, the second configuration being deformed relative to the first configuration.

FIGS. 1 and 2 show an embodiment of a balance for a horological regulating member according to the invention.

The balance 1 comprises a rotary staff 2 enabling it to rotate when arranged in a regulating member. The balance 1 further comprises a body 10 that can be deformed as a function of temperature. The deformable body 10 is mounted on the rotary staff 2, the balance 1 being capable of moving about a centre of rotation 11 located on the rotary staff 2.

The deformable body 10 has a peripheral shape that is at least partly annular. The deformable body includes a first annular part 3 and a second annular part 4.

The two annular parts 3, 4 are connected by a radial section 7 mounted on the rotary staff 2, preferably in the middle thereof.

Each annular part 3, 4 is connected and extends from an opposite end of the radial section in a position opposite each other, symmetrically relative to the rotary staff 2 and the centre of rotation 11.

Each annular part 3, 4 describes a curve of equal radius to form an arc of a circle, preferably equal to each other. The two annular parts 3, 4 thus form a ring that is open at two opposite points that are symmetrical relative to the centre of rotation 11.

The first annular part 3 is provided with a first free end 12, and the second annular part 4 is provided with a second free end 13. The two free ends 12, 13 are arranged in the two open positions. Each free end 12, 13 is arranged at the end of one of said annular parts 3, 4.

In order to be able to deform as a function of temperature, the first and second annular parts 3, 4 are each formed by a bimetallic attachment. A bimetallic attachment is made up of two layers of different materials 8, 9, which enable it to deform as a function of temperature in a predefined direction. The two annular parts 3, 4 are thus deformable as a function of temperature.

Under the effect of temperature, the annular parts 3, 4 deform to a greater or lesser extent, so that the free ends 12, 13 move further away from or closer to the centre of rotation 11. The moment of inertia of the balance 1 is thus modified in order to maintain a substantially constant rate.

In FIG. 1, the free ends 12, 13 of the annular parts 3, 4 are closer to the centre 11, whereas in FIG. 2, the free ends 12, 13 are located further from the centre of rotation 11.

To adjust the sensitivity of the balance 1 to temperature, the balance 1 further comprises means 20 for adjusting the sensitivity of the deformable body 10 to temperature change.

The adjustment means 20 are provided with a first inertial element 5 arranged on the deformable body 10 so that the moment of inertia thereof can be modified. The first inertial element 5 is arranged at the first peripheral free end 12.

Preferably, the adjustment means 20 comprise a second inertial element 6 arranged at the second free end 13. The first inertial element 5 and the second inertial element 6 are arranged symmetrically relative to the centre of rotation 11. The adjustment means 20 thus have a substantially symmetrical configuration.

In this embodiment, the first and second inertial elements 5, 6 are screws, arranged to be screwed to a greater or lesser extent into each free end 12, 13. The screws are highly resistant to impacts and gravity.

The inertial elements 5, 6 are capable of moving relative to the deformable body 10 into a plurality of positions.

According to the invention, the positions form a continuous set. The sensitivity of the adjustment means 20 can thus be precisely and continuously adjusted.

The first inertial element 5 and the second inertial element 6 are each capable of being displaced in a direction substantially tangential to the deformable body 10. Thus, each screw is screwed to a greater or lesser extent and tangentially to the balance, in particular tangentially to the deformable body 10, in a free end 12, 13, in order to change their positions relative to the deformable body 10.

Thanks to this positioning, each inertial element 5, 6 maintains a substantially constant distance from the centre of rotation 11, regardless of its position relative to the deformable body 10, for a given deformation of the annular parts 3, 4. The extent to which the screw is screwed in does not change the distance thereof from the centre of rotation 11.

The distance between each inertial element 5, 6 and the centre of rotation 11 may vary due to the deformation of the annular parts 3, 4 under the effect of temperature change. However, the displacement of the inertial element 5, 6 relative to the deformable body 10 does not result in any change in the distance between the inertial element 5, 6 and the centre of rotation 11 for a given configuration of the deformable body 10.

The invention further relates to a regulating member, not shown in the figures, including a balance 1. The invention further relates to a movement comprising such a regulating member.

It goes without saying that the invention is not limited to the embodiments described with reference to the figures and alternatives can be considered without leaving the scope of the invention.

The invention claimed is:

1. A balance for a regulating member of a horological movement, the balance comprising:

a body that can be deformed as a function of temperature, at least a part of the deformable body being arranged on a periphery of the balance, the balance being configured so as to be able to move about a center of rotation, adjustment means for adjusting the sensitivity of the deformable body to temperature change, wherein the adjustment means includes a first inertial element arranged on the deformable body in order to be able to modify the moment of inertia thereof, wherein the first inertial element is configured to move relative to the deformable body into a plurality of positions, wherein the first inertial element is configured to be displaced and moved relative to the deformable body along an axis in a direction tangential to the deformable body, and wherein each of the plurality of positions form a continuous set along the axis.

2. The balance according to claim 1, wherein the first inertial element is arranged at a constant distance from the center of rotation, regardless of the position thereof relative to the deformable body, for a given configuration of the deformable body relative to the center of rotation.

3. The balance according to claim 1, wherein the deformable body comprises a first peripheral free end, the first inertial element being arranged at the first free end.

4. The balance according to claim 1, wherein the adjustment means comprise a second inertial element capable of moving relative to the deformable body into a second plurality of positions forming a second continuous set.

5. The balance according to claim 3, wherein the deformable body comprises a second free end, the second inertial element being arranged at the second free end, so as to be able to be displaced in a direction substantially tangential to the balance.

6. The balance according to claim 4, wherein the first inertial element and the second inertial element are screws, each screw being screwed tangentially to the body in a free end in order to change their positions.

7. The balance according to claim 1, wherein the first inertial element and the second inertial element are arranged symmetrically relative to the center of rotation.

8. The balance according to claim 1, wherein the deformable body has a peripheral shape that is at least partly annular.

9. The balance according to claim 8, wherein the deformable body includes a first annular part provided with the first free end, and a second annular part provided with the second free end.

10. The balance according to claim 9, wherein the first annular part and the second annular part each include a bimetallic attachment so that they can deform as a function of temperature.

11. The balance according to claim 9, wherein the two annular parts are connected by a radial section.

12. The balance according to claim 9, wherein the two annular parts are arranged symmetrically relative to the center of rotation.

13. A regulating member comprising a balance according to claim 1.

14. A horological movement, comprising a regulating member according to claim 13.

* * * * *